(12) United States Patent
King

(10) Patent No.: US 8,849,706 B2
(45) Date of Patent: Sep. 30, 2014

(54) METHOD FOR UPDATING PRICES WHILE SHOPPING

(71) Applicant: Christine King, Brooklyn, NY (US)

(72) Inventor: Christine King, Brooklyn, NY (US)

( * ) Notice: Subject to any disclaimer, the term of this patent is extended or adjusted under 35 U.S.C. 154(b) by 159 days.

(21) Appl. No.: 13/662,902

(22) Filed: Oct. 29, 2012

(65) Prior Publication Data

US 2013/0048723 A1 Feb. 28, 2013

Related U.S. Application Data

(63) Continuation-in-part of application No. 13/090,342, filed on Apr. 20, 2011, now abandoned.

(51) Int. Cl.
*G06Q 30/00* (2012.01)
*G06Q 30/06* (2012.01)
*G06Q 30/02* (2012.01)

(52) U.S. Cl.
CPC ............ *G06Q 30/02* (2013.01); *G06Q 30/0633* (2013.01)
USPC ........................................ 705/26.1; 705/26.8

(58) Field of Classification Search
USPC ..................... 705/26.1, 27.1, 26.8
See application file for complete search history.

(56) References Cited

U.S. PATENT DOCUMENTS

| | | | |
|---|---|---|---|
| 5,295,064 A * | 3/1994 | Malec et al. .................. 705/1.1 |
| 5,345,071 A | 9/1994 | Dumont | |
| 5,424,524 A * | 6/1995 | Ruppert et al. ................. 705/17 |
| 5,939,695 A | 8/1999 | Nelson | |
| 5,979,757 A | 11/1999 | Tracy | |
| 6,587,835 B1 * | 7/2003 | Treyz et al. ................. 705/14.64 |
| 6,604,681 B1 | 8/2003 | Burke | |
| 6,978,930 B2 | 12/2005 | Harding | |
| 7,599,855 B2 * | 10/2009 | Sussman ...................... 705/26.8 |
| 2001/0039519 A1 * | 11/2001 | Richards ........................ 705/27 |
| 2008/0195460 A1 * | 8/2008 | Varghese ........................ 705/10 |
| 2010/0082447 A1 * | 4/2010 | Lin et al. ......................... 705/26 |
| 2011/0072132 A1 * | 3/2011 | Shafer et al. .................. 709/224 |
| 2012/0209749 A1 | 8/2012 | Hammad | |

OTHER PUBLICATIONS

Urbany, Joel E., Peter R. Dickson, and Alan G. Sawyer. "Insights into cross-and within-store price search: Retailer estimates vs. consumer self-reports." Journal of Retailing 76.2 (2000): 243-258.*

* cited by examiner

*Primary Examiner* — Matthew Zimmerman
(74) *Attorney, Agent, or Firm* — Daniel Boudwin; Global Intellectual Property Agency LLC

(57) ABSTRACT

A shopping system and method for assisting consumers with budgeting and taking advantage of time-sensitive pricing offers. The system comprises a handheld wireless device capable of capturing images of quick response (QR) codes and scanning linear image indicia; a remote pricing information provider; and a personal computer. Pricing information about specific products or a category of products is downloaded from a pricing information provider either directly to the wireless device or to a personal computer and then transferred to the wireless device. The consumer then scans a QR code associated with a time-sensitive offer to update the pricing information stored in the wireless device. When the consumer goes shopping, he scans the barcodes of products for purchase and the associated pricing information is accessed by the device to create a summed total of scanned products. Consumers can use the system to maintain their budget and take advantage of store discounts.

13 Claims, 7 Drawing Sheets

METHOD FOR UPDATING PRICES WHILE SHOPPING

CROSS-REFERENCE TO RELATED APPLICATION

This application claims the benefit of U.S. application Ser. No. 13/090,342 filed on Apr. 20, 2011 entitled ". Personal Barcode Scanning Device and Phone Application" this patent application is incorporated herein by reference in its entirety to provide continuity of disclosure.

BACKGROUND OF THE INVENTION

1. Field of the Invention

The present invention relates to a system and method for shopping using a handheld wireless device. More specifically it relates to a system and method for preloading pricing information onto a handheld device and then updating pricing information for specific items via scanning of an encoded message by the handheld device. Encoded messages are presented in the form of QR codes that are scanned by the device to obtain pricing update. This automation of the pricing update process during shopping will be appreciated by users who shop for large numbers of items or items whose price may be subject to frequent change, such as items in a grocery store.

Department stores, big box stores, grocery stores, and other stores with large inventory supply often have regular price fluctuations. These price changes may be weekly, monthly, and sometimes daily for special events or holidays. Historically, stores sent out mass mailing materials in the form of advertising circulars to update potential patrons on pricing changes. Advertising circulars, short publications on loose-leaf paper, contained information on products going on sale, such as name of product, manufacturer, size, condition, and sale price. Though this method is still used for special events and holiday sales, many stores have begun using the Internet to reach out to customers. Websites provide an easy to use medium for displaying short terms sales to a large number of people. Weekly and monthly emails are sent to customers informing them of upcoming discounts and sales.

The Internet as a tool for distributing advertising information may be more accessible than advertising circulars to some users, but both of these means cost a user their valuable time. Keeping up with regularly changing price fluctuations requires monitoring of various advertising means prior to or during the organization of a shopping list. Images of shoppers huddled over piles of advertising circulars on a table, while the person clips coupons or jots down sale prices, are familiar scenes for most Americans. Some of the hunching now takes place over a keyboard and mouse instead of a pile of papers, but the effort is the same. Time must be spent combing through various advertising publications, physical and digital, to obtain information on what products are on sale. Often, users must bring the advertisement with them, in the form of a coupon or voucher, in order to obtain the listed pricing. This further expends a user's time as they must collect and organize coupons in order to create a shopping budget.

After entering a store, the user does not have an easy way of checking for further price specials except for asking a store clerk. In large stores, the sales clerks are often assigned to specific departments and may not be aware of special pricing offers in other areas of the store. This can be highly frustrating for bargain shoppers and those on a budget, as they want to make sure that they are getting the best price possible for goods. A system and method are needed that provides a user with a way to obtain updated pricing information from a variety of sources in a convenient, easy to use and timely manner.

2. Description of the Prior Art

The present invention provides a system and method for shopping using pre-loaded pricing information that is updated at any time via information obtained from scanning a QR code. Users can pre-load generalized pricing information for a particular store or pricing information from several stores for a list of specific items on to a handheld wireless device. The device is capable of scanning barcodes of products for purchase and QR codes associated with advertisements. Scanning of a QR code updates pricing information stored within the device, ensuring that the user obtains up-to-date prices on goods, without having to clip coupons, store advertising circulars or search through emails. The user does not need to be in the store when the QR code scanning takes place. QR codes can be scanned from any location and the pricing information retained for later shopping trips. The prior art fails to describe a system and method that incorporates the updating of pricing information via QR codes at any time after the initial pricing information is obtained.

Dumont U.S. Pat. No. 5,345,071 is directed to a purchase monitoring device, to be used by a shopper in a self-service checkout store having items with bar codes which identify the item and its price, the device including primarily a portable handset having a bar code scanner, which enables pricing and identification data to be displayed on an LED on the handset. Through the selective use of a price check button, a purchase button, and a return button, the price of the item may be checked, added to a running total of purchase items, or removed from a running total of purchased items. Ruppert U.S. Pat. No. 5,424,524 is directed to a personal bar code scanning device for shoppers to track expenditures and speeding the process of checkout, as well as taking advantage of coupons. A microprocessor coupled to a bar code reader, a communication port, an audible feedback device and a touch screen or light pen and display combination carries out bar code scanning in a store as a shopper shops. The inventions described in Dumont and Ruppert require the implementation of storewide communication systems. The present invention does not require such a system and may be easily and cost-effectively implemented at any retail location with a simple handheld mobile device.

Nelson U.S. Pat. No. 5,939,695 is directed to a device for providing product information to customers of a retail establishment. The device is a hand-held unit that contains a detector to identify a product located nearby. The identification can be accomplished through scanning a bar code affixed to the product. Once the product is identified, the device retrieves descriptive information about the product from memory, and displays the information to the customer. Tracy U.S. Pat. No. 5,979,757 is directed to an improved portable shopping system. The shopping system is provided with an improved data presentation system for presenting customer desired data on a portable terminal. The portable terminal includes audio as well as video presentation means to provide customer specific marketing and promote the sale of identified items. The inventions described in the Nelson and Tracy patents are directed primarily to marketing and other retail information rather than efficiently assisting the shopper in both product selection and budget maintenance. The present invention provides consumers with a system and method for setting a budget, and obtaining updated pricing information to ensure accuracy of budgeting.

Burke, U.S. Pat. No. 6,604,681 discloses a system that utilizes a handheld device that is wirelessly connected to a database to provide information about specific goods. The handheld device is capable of scanning and reading a barcode, and then transmitting that barcode information over a wireless signal to a remote server. Information about the product associated with the barcode is returned to the user for the purposes of evaluating a product for potential purchase. This information may include product specifications, consumer reviews, retailer or manufacturer information, and the like. Similar to the invention described in Burke, Harding U.S. Pat. No. 6,978,930 is directed to a shopping system for scanning codes related to products, such as consumer goods and services, and for retrieving data associated with the codes. The system includes a portable, hand-held and battery-operated optical code scanner for scanning, capturing, storing and decoding information related to scanned codes, at least a shopping kiosk having a processor, and at least a host computer operatively coupled to the shopping kiosk. The scanner and the shopping kiosk are configured such that the scanner transfers decoded data to the kiosk, and the kiosk provides the transferred decoded data in a useable format by means of a display monitor and/or a printer. Upon receipt and recognition of the transferred decoded data and/or the identification code, the first host computer selects and retrieves stored information associated with the decoded data. Such retrieved information downloads to the kiosk and is displayed to the identified user.

Both the Burke and Harding inventions require significant investment on the part of the retail owner and involve installation of major wired or wireless systems. These patents do not disclose pre-population of pricing data on a wireless device, to reduce the need for individual wireless transmissions every time an item is scanned. Furthermore, neither of these devices contemplates the use of QR codes for obtaining updated pricing information.

Hammad, U.S. Patent Application Publication No. 2012/0209749 discloses a system of completing a transaction using a QR code and a virtual wallet. The virtual wallet is stored on a user's cellphone or other mobile device and contains personal financial information such as banking information. When a user shops at a retail store, he or she brings selected items to a store kiosk and uses an optical reader on the kiosk to scan the barcodes of each item. The kiosk keeps a tally of the items scanned and generates a running total of the overall purchase price. After the user is done scanning items, the kiosk generates a quick response, QR code containing information about the order and merchant authorization information. The user scans this code with his or her cell phone and information from the user's digital wallet is then sent to the merchant authorization entity to complete the purchase transaction. This system helps users purchase items without having to provide their personal financial information to a retailer. The system does not disclose the use of QR codes to update pre-stored pricing information on a handheld wireless device. The present invention provides a system that assists users with budgeting on shopping trips and obtaining the most up to date and accurate pricing information for products the user is interested in purchasing.

These prior art devices and systems have several known drawbacks. They all require a retailer to set-up and maintain elements of the system and they do not provide a means for incorporating pricing specials via visual indicia. The present invention provides a system and method that allows users to build shopping lists, pre-load pricing information on a handheld wireless device, and update that pricing information as desired. It substantially diverges in design elements from the prior art and consequently it is clear that there is a need in the art for an improvement to existing budgeting and shopping systems. In this regard the instant invention substantially fulfills these needs.

SUMMARY OF THE INVENTION

In view of the foregoing disadvantages inherent in the known types of shopping systems and methods using a handheld wireless device now present in the prior art, the present invention provides a new pricing information updating means wherein the same can be utilized for providing convenience for the user when shopping for on sale items.

The present invention provides both a system and a method for shopping using a handheld wireless device that updates pricing information via quick response (QR) codes. Wireless computing devices such as cell phones, tablet computers, computer wristwatches and the like are ideal for use with the present system, but handheld computing devices that provide functions specific to the system may also be used. The handheld device must have a camera and either software for reading a barcode from a digital image capture, or an optical barcode scanner. These elements allow the handheld device to receive pricing information and receive information about products for purchase.

Pricing information is pre-loaded onto the handheld device through a physical connection with a personal computer or through a wireless connection with a remote server. The user accesses a merchant website and downloads files containing pricing information to the personal computer or handheld wireless device. Specific products can be selected, a category of products, or several of each. For example, a user may choose to download pricing information on a store's selection of ladies shoes so that when the user goes to the physical store, she can simply scan a pair of shoes to check the price.

Any pricing information obtained prior to shopping can be used to form a shopping list; Users may pull pricing information for a variety of different items off the websites of associated merchants and then build an itemized list that is stored in the handheld wireless device. Alternatively the user can simply set a budget price or price range within the handheld wireless device. Software loaded on the device will add up the cost of items scanned with the barcode reader and compare them against the shopping list or budget total.

The present invention gives users the opportunity to take advantage of limited time offers, sales, and price updates. Quick response codes containing sale pricing information may be placed in highly visible locations so that users can scan the QR code with the handheld wireless device. Posters, advertising circulars, sale stickers, websites and other media may be used to display the QR code to a shopper. When the user scans a QR code the pre-loaded pricing information is updated to reflect limited availability pricing. Any limited availability pricing information for which there is no pre-loaded pricing data, will create a new pricing entry, allowing the user to purchase sale items that they did not initially contemplate for purchase.

It is therefore an object of the present invention to provide a new and improve shopping system and method that has all of the advantages of the prior art and none of the disadvantages.

It is therefore an object of the present invention to provide a system and method that assists users in creating a budget based on current pricing information for items they wish to purchase.

Another object of the present invention is to provide a method for reducing the number of steps a user must complete in order to create a shopping list and take advantage of time-sensitive pricing opportunities.

Yet another object of the present invention is to provide a system that includes a handheld wireless device to obtain and store pricing information for when a user goes shopping.

Still another object of the present invention is to provide a system and method of shopping that incorporates the scanning of quick response codes to obtain time sensitive pricing information and then makes that pricing information immediately available to a user.

A further object of the present invention is to provide a system that gives users the ability to capture images of sale pricing indicia and retain the associated pricing information for later use. Rather than carrying around advertisements of jotting down phone numbers for advertised services, the user simply takes a picture of an associated QR code to obtain the pricing information and store it in the handheld wireless device until the user is ready to take advantage of the offer.

A still further object of the present invention is to provide a system and method that facilitates taking advantage of time sensitive pricing offers without necessitating the cutting of coupons.

Another object of the present invention is to provide a system and method that are device independent, allowing a consumer to utilize whatever handheld wireless device they prefer.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
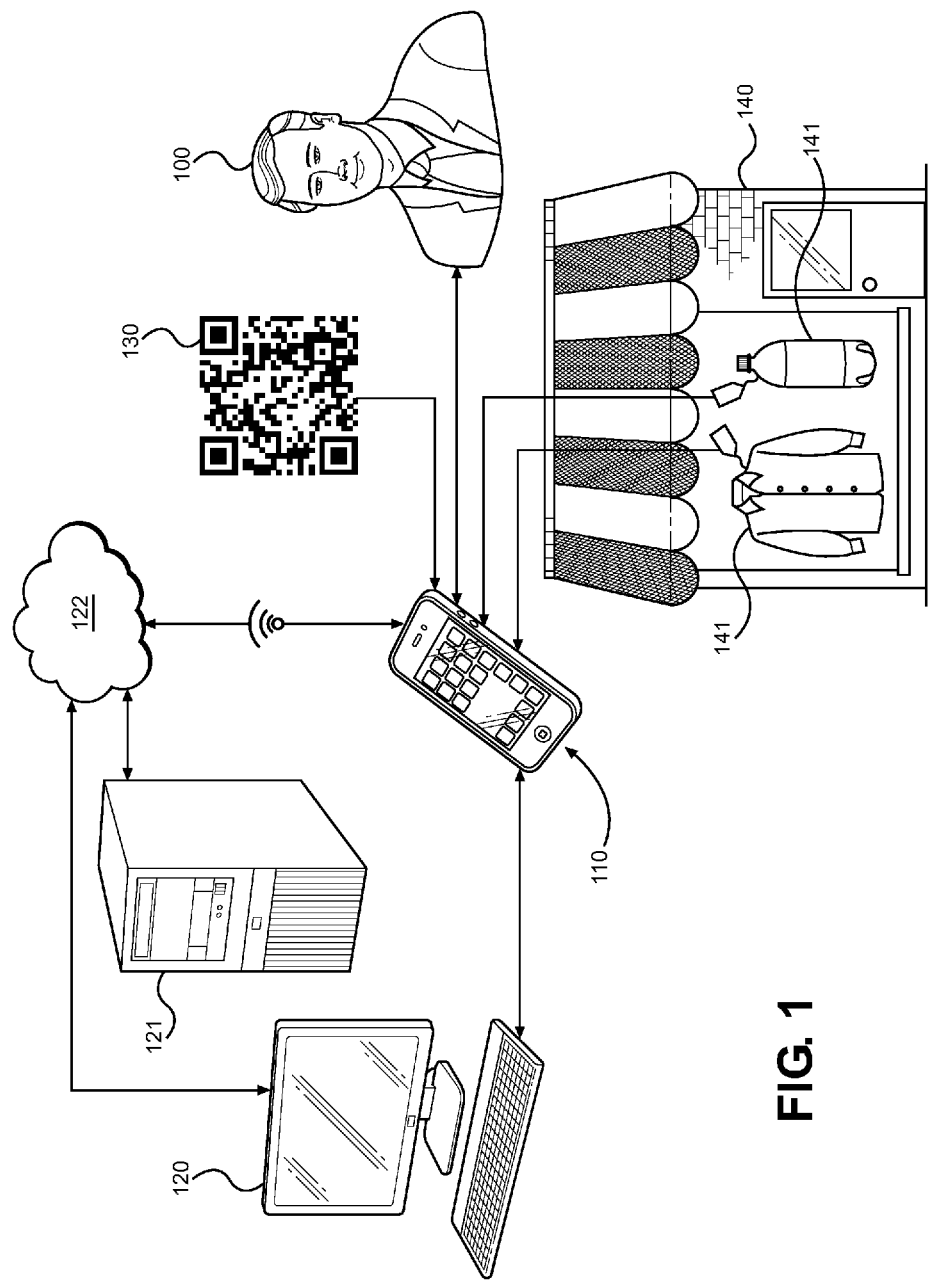
FIG. 1 shows a general system diagram of the overall system. Interaction between the various elements of the system is illustrated.

Reference is made herein to the attached drawings. Like reference numerals are used throughout the drawings to depict like or similar elements of the system and method of shopping using pre-loaded pricing information and updated pricing information. For the purposes of presenting a brief and clear description of the present invention, the preferred embodiment will be discussed as used for creating a shopping list and budget and then taking advantage of limited time pricing offers. The figures are intended for representative purposes only and should not be considered to be limiting in any respect.

Referring now to FIG. 1, there is shown a diagram of the shopping system. A consumer 100 uses a handheld wireless device 110 to obtain pricing information prior to shopping, to update that pricing information, and to use the information while shopping for a variety of goods or services. Pricing information about specific products or a category of products is obtained from a pricing information provider 121 prior to the consumer's shopping experience. The information will be stored on the handheld wireless device for use at the shopper's convenience. The pricing information may be updated at any time via scanning of a QR code 130 with the handheld wireless device. Pricing information stored in the device is updated to reflect time sensitive pricing of a product or service, thereby providing the consumer with up-to-date information about special offers and discount without the need for physical coupons or time spent in deal hunting. The consumer can go to an online merchant, service provider or retail store 140 and scans the barcodes of products 141 or service offers that he or she wishes to purchase. Scanned items are tracked within the handheld device and a total price is available to the user for comparison with a budget price. Thus the system assists consumers in shopping on a budget and taking advantage of advertised discounts.

A consumer 100 desiring pricing information from a specific retailer will use a network 122 such as the Internet, to access a merchant website and make a selection regarding the pricing information desired. Software is embedded in the handheld wireless device that allows it to interface with a pricing information provider or a personal computer. The consumer can create shopping lists on a personal computer 120 or the handheld wireless device and upload the list to one or more pricing information providers 121 in the form of a request for pricing information. The shopping list may be in a spreadsheet format, a list of product SKUs, or other easily transmittable document formats. Alternatively, the user may make general requests for pricing information on items within a selected category.

The requested information is downloaded to the personal computer or directly to the handheld wireless device. If the requested information requires a large amount of storage space, it may not be available for wireless download directly to the handheld device. Pricing information stored on a personal computer can be transferred to the handheld device via a physical connection such as USB, firewire, or the like. Once information is downloaded or transferred to the handheld device, the embedded software application will store it in an organized fashion. Organizational structures may vary according to the implementation of the system, but prices and associated merchant identification information should be stored in connection with specific product sku and barcode information. Optionally, additional client software can y installed on the personal computer to assist a user with creation of shopping lists and management of pricing information, but this is not necessary to the function of the system.

A unique aspect of the system is the use of quick response (QR) codes to update pricing information stored within the handheld wireless device. The QR code 130 is two-dimensional encoded indicia capable of transferring a variety of data to a user. The indicia includes four squares, disposed in the corners of the code, three to provide positioning data to an image reader, and a fourth to provide alignment data. Small black squares are specifically oriented between and amongst the corner squares to provide binary information to an image reader. The handheld device of the present system contains a camera or other optical image reading means to capture digital images of a QR code. An embedded software application on the handheld device decodes a scanned QR code, transferring the contained information into an appropriate format.

In a preferred embodiment the QR code will contain information directing the handheld device to communicate with a pricing information provider. For example a uniform resource locator (URL) that directed to a merchant website or fileserver. After the code is decoded by the system, the handheld device will initiate wireless communication in order to access the specified URL. Access of the URL will prompt the automatic downloading of additional pricing information to the wireless handheld device. This pricing information will relate to prices for products or services at a particular store, mall, service provider or the like. The embedded software application will compare the new pricing information with pre-loaded pricing information, update any price conflicts, and add new product/merchant information as needed. In this way, a consumer can use the convenience of QR codes to take advantage of limited time pricing offers such as sales, discounts, or special offers. The consumer simple scans the QR code displayed on an advertising circular, a store website, a poster, or any other advertisement, to obtain updated pricing information that can be used during shopping. Because such offers are by their nature limited, pricing information will include validity limitations, which are checked by the embedded software application during updates.

As they shop, consumers scan barcodes or other encoded indicia placed on a product 141 or service offer. The embedded system application compares the scanned indicia with the pre-loaded pricing information to obtain a product cost. Costs are summed as the user shops, and a total will be displayed to the user via a display on the handheld wireless device. Products may be manually added or subtracted from the sum total via the embedded software application. The consumer can visually compare the sum total against a budget that is pre-set by the user. Optionally, the handheld wireless device will automatically make the comparison and display to the user a "remaining balance." The system will be appreciated by price conscious consumers who wish to take advantage of shopping sales without having to spend large amounts of time searching for coupons and discounts.

Figure 2:
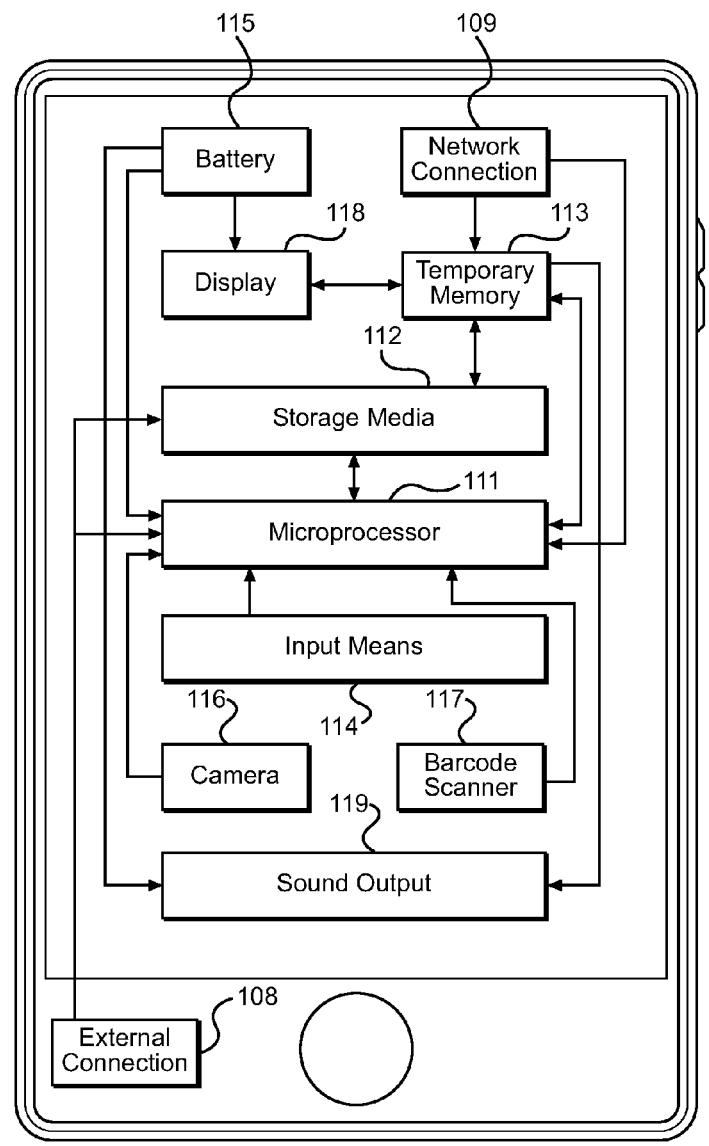
FIG. 2 shows a general diagram of an exemplary handheld wireless device in the form of a smartphone.

Referring now to FIG. 2, there is shown a general diagram of an exemplary handheld wireless device 110. A variety of handheld wireless devices may be used with the present system but some common features are necessary for a given device to perform properly. The device must have a microprocessor 111, a storage media 112, a temporary memory (RAM) 113, and a power source 115. A software application is stored on the storage media and executed via the microprocessor and the temporary memory. The software application comprises an organized algorithm for facilitating the interactions between system components, accessing and analysis of pricing information stored on the storage media, and processing and decoding of encoded indicia. Pricing information is also stored on the storage media, preferably in a database format. The programming of device drivers, network connection routines, database accessing, and indicia decoding are known in the art. As such, the exact specifications of the embedded software application may vary depending on the handheld wireless device.

The device will also have an input means 114 such as a keyboard or task specific buttons. They may be physical or may be touch-screen adaptations. Any implementation of an input means should provide the user with at least the ability to input alphanumeric characters to form a budget, add or delete items from a shopping list or sum total list, initiate capture of QR codes and initiate barcode scanning.

Quick response codes are captured using a digital camera 116 that may be positioned on any side of the device. The camera must have sufficient resolving power to capture the different data sectors of a QR code. Cameras of smartphones and most cellphones are capable of easily capturing and resolving a QR code. The camera may also be used to capture and resolve barcodes. An optional barcode scanner 117 may also be included. This scanner is an optical scanner that reads one-dimensional encoded indicia, i.e., a linear image. Most product barcodes are standard UPC barcodes and are not large. The barcode scanner thus does not need any new features or a large scanning range in order to be effective in retail establishments.

A display 118 and audio output 119 provide visual and auditory feedback to systems users. Any display type known in the art of handheld computing devices may be used, but touch-screens are preferred. Displays with backlighting, Light Emitting Diode (LED) Liquid Crystal Displays (LCD), or standard LCD screens are preferred because of the clarity and brightness of the image they provide to a user. When a user scans a QR code the display will provide the user with visual indication that a merchant offer is being accessed and pricing information is being updated. Consumers can elect to see a list of the products and services whose prices were updated via the QR code information. This lets the user see the items subject to the time-sensitive offer and make pricing decisions accordingly. Item can be added to or removed from a shipping list if the updated pricing information results in a consumer's desire to purchase different products or purchase from a different merchant. The audio output provides users with an audible indicator that products or service offers have been successfully read by the barcode reader. Other audible alerts include an indicator that the pre-set budget number has been exceeded, and a successful QR code scanning. Any speakers known in the art of handheld computing devices may be used to provide this audio output. In this way, consumers do not have to regularly check the display while shopping because they will be alerted by a sound when particular actions occur.

The handheld wireless device may be connected to another computer via an external connection means 108 or a network connection means 109. An external connection means such as a USB port, male or female, or a firewire port is used to connect the device to a personal computer. Large amounts of data can be easily transferred over the physical connection between the personal computer and handheld wireless device. This connection means will be useful when a consumer wants to store entire categories of pricing information on the handheld wireless device. For example, the user may want to buy a purse from a department store but may not be sure what purse she wants to buy. She can log onto a merchant website via a personal computer, and select a "handbags" category and download the merchant's pricing information on their inventory of handbags. Depending on the store, there may be a great deal of pricing information associated with the handbags category, making it impractical to transfer the information wirelessly. Thus, the consumer can plug their handheld wireless device into the personal computer using an appropriate connection cord if necessary, and transfer the pricing information to the handheld device. Additionally, USB connections provide the benefit of charging the power supply of a handheld wireless device, making this an advantageous external connection means.

The device will also contain a wireless network connection means to facilitate communication between the device and a remote computer. Common network connection protocols such as the 802.11, 3G, 4G, 4GS, and GPRS standards may be used to connect the handheld wireless device to the network. The network connection means provides users with the ability to connect to a pricing information provider directly without requiring the intermediate personal computer. Pricing information can be downloaded directly to the user's phone, a feature of the system that will e useful to consumers on the go, or those who are away from their personal computer when they decide to go shopping. The ability to connect to a pricing information provider directly is essential to the proper functioning of the system. Scanned QR codes will cause the embedded software application to initiate a connection between a pricing information provider and the handheld wireless device. Time-sensitive pricing information is obtained from the pricing in information provider via this connection and the pricing information stored on the storage media is appropriately updated. Updated pricing information is then available for the consumer to utilize during a shopping trip.

Figure 3A:
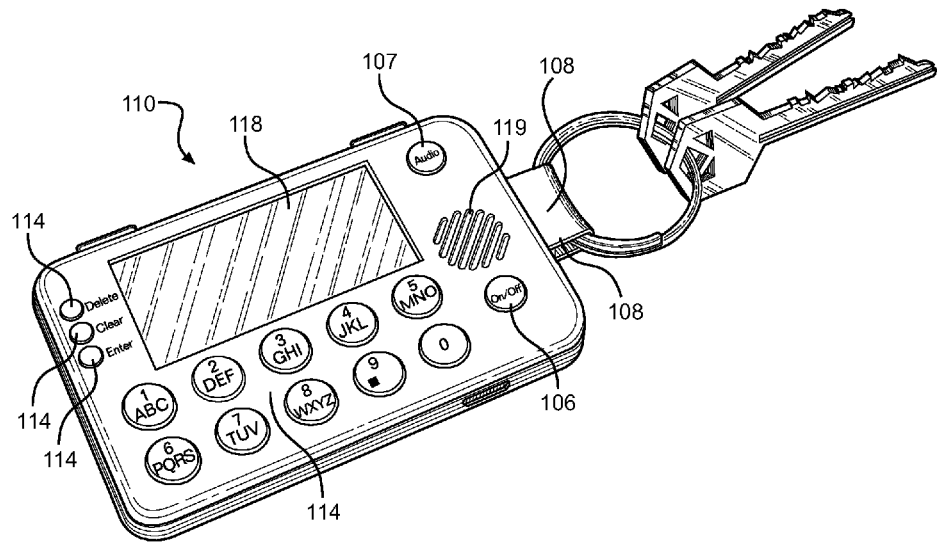
FIG. 3A shows a perspective view of the front of an exemplary proprietary handheld wireless device for use with the system.
Figure 3B:
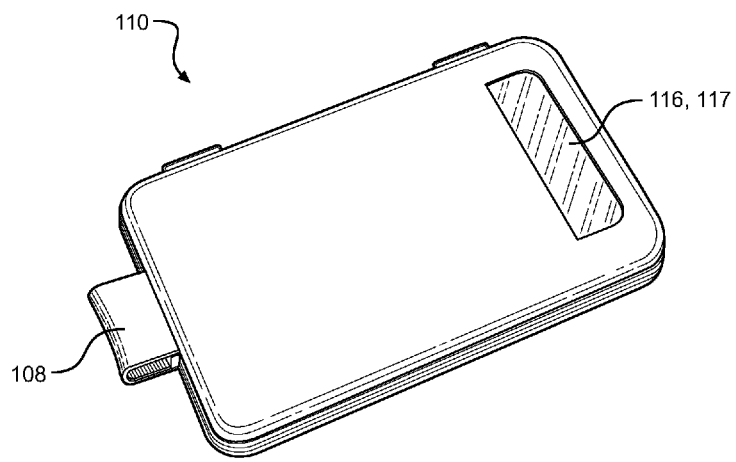
FIG. 3B shows a perspective view of the back of an exemplary proprietary handheld wireless device for use with the system.

Turning now to FIGS. 3A and 3B there is an exemplary handheld wireless device. Smartphones and other cellphones may be used with the present system, but proprietary devices may also be developed. FIGS. 3A & 3B illustrate an example of a proprietary device for personal shopping. The handheld wireless device 110 has a display 118, a variety of input buttons 114 that can be used to create a budget number, and add or delete items, a sound output means 119, and an external connection means 108. A window on the back of the device protects a digital camera 116 and barcode scanner 117 housed within the device. The external connection means is a male USB port with a cap that is connected to a keychain. In this way, the device is like a portable flash drive. This design eliminates the need for additional cords or connectors because the device can be plugged directly into the female USB port of a personal computer. An audio toggle button 107 is disposed on the front of the device for controlling sound volume and a power button 106 turns the device on and off. The illustrations demonstrate that many different types of devices are contemplated for use with the system. Though smartphones are a convenient handheld wireless device, they are by no means the only devices that can meet the needs of system users.

The system of the present invention connects consumers with merchants, online retailers, and service providers to provide direct access to advertising specials and time-sensitive offers. Consumers can form shopping lists of items for purchase or decide on a type of item they wish to buy and then check the merchant's website, advertising circulars, posters, or other visual advertising means for sales. A QR code associated with the sale will be displayed along with the advertising. The user scans the code to obtain pricing information about the items or services for sale and can then utilize the information in budgeting. The system thus eliminates the need for searching through advertising circulars for items or cutting coupons from publications, because all discounts are applied via the QR code pricing update.

Figure 4:
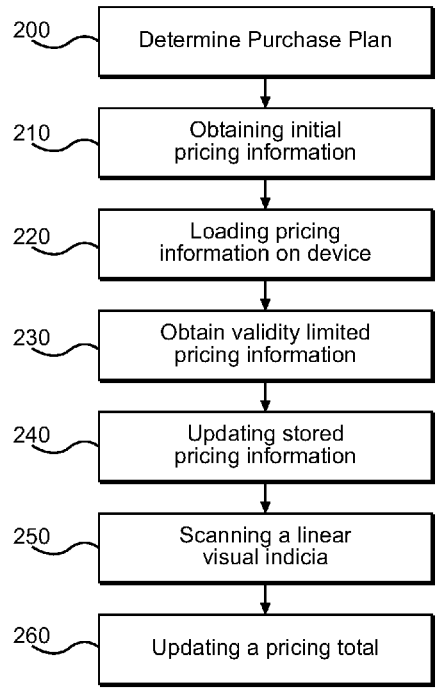
FIG. 4 shows a flow chart diagram of the overall method of shopping.

The method of shopping using pre-loaded pricing data and updating that data is shown in FIG. 4. The method comprises the steps of determining a purchase plan 200. Obtaining pricing information 210, loading pricing information on a handheld wireless device 220, obtaining validity limited pricing information 230, updating pricing information stored in the handheld wireless device 240, obtaining an indicia associated with a particular product or service 250, and updating a tracking measurement associated with scanned items 2560. If followed by a consumer, the method provides a simple way to establish a shopping budget, find sales, discounts, and special offers, and then factor those offers into a shopping budget.

Figure 5:
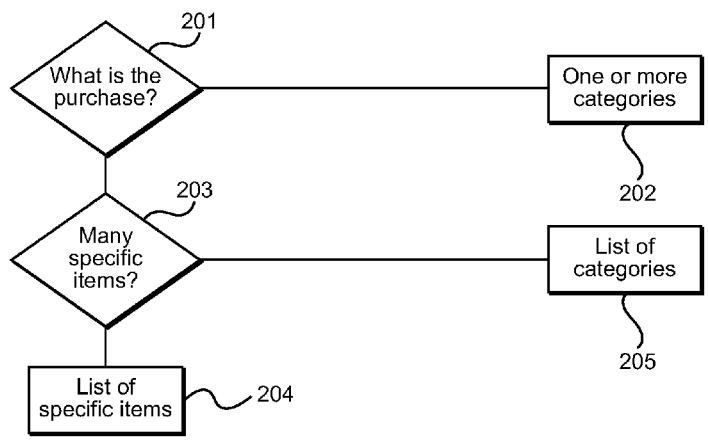
FIG. 5 shows a flowchart diagram of the steps of determining a purchase plan.

The first step, illustrated in FIG. 5 is to determine a purchase plan. First the consumer must decide what items or services he or she would like to purchase 201. They may elect to purchase only one or more types of items 202 without deciding what specific models or brands they would like to purchase. For instance, the user may decide to purchase a new set of steak knives or get an oil change without knowing what specific set of knives or what oil change service level they would like. If the user has multiple categorical items to purchase, he or she can make a short category list 205 in a digital document. Alternatively, the consumer may decide to create a shopping list of needed items 203. If the user knows what brands and services they would like to purchase then they can create a specific items list 204 in a digital document format. If the user is not sure about the brand to purchase for some items, then a category list can also be created. Lists can be created in digital documents such as text documents, spreadsheets, and document image files. Execution of this step may vary depending on whether the consumer is at home near a personal computer or on-the-go with the handheld wireless device. Generation of large shopping lists may be difficult for users who have limited time or are moving around, but the system will still be useful for determining a purchase plan for a small purchase plan creation or a single categorical item purchase plan.

Figure 6:
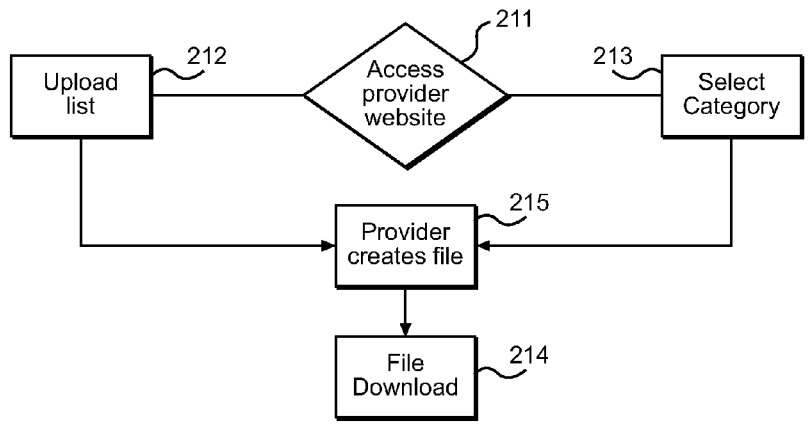
FIG. 6 shows a flow chart diagram of the obtaining of pricing information from a remote pricing information provider.

Next, the consumer obtains pricing information associated with the selected purchase plan, as shown in FIG. 6. The consumer can use a personal computer, laptop, tablet computer, or the handheld wireless device to access the website 211 of a pricing information provider, i.e., a merchant or service provider. In a preferred embodiment, the user will be given the option of uploading a document or spreadsheet file containing a list 212 of specific items or categories, or selecting from a pre-populated menu of categories. The pricing information provider website will prepare a pricing information file 215 containing pricing information based on the contents of the uploaded document or selected categories. A pricing information file will contain data associated with an item such as UPC number, sku, brand, model, price, any validity limitations, and a merchant identifier. Numerous items may be contained within one file. This file is downloaded by the user 214 and loaded on the wireless handheld device 220 (see FIG. 4).

The pricing information, once obtained must be transferred to the handheld device, where the file will be accessed by a software application embedded on the storage media of the wireless device. If the consumer uses the handheld wireless device to obtain pricing information, then the pricing file is downloaded directly to the handheld wireless device. But, if the consumer obtained pricing information via a personal computer, laptop, or tablet computer, then the pricing information will need to be transferred to the handheld wireless device. This can be accomplished via a physical connection such as USB, firewire, or even Ethernet. Alternatively, short range wireless protocols such as Bluetooth, or a wireless local area network may be used to wireless transmit pricing files to the handheld wireless device. Wireless transmission may not be practical or time-efficient if the pricing files are large in one embodiment the pricing information is a proprietary file type that the embedded application scans for on start-up of the application. In another embodiment the user must start the application and then load the file. In another embodiment there is a client application embedded on the personal computer, laptop, or tablet pc, that transfers pricing information files directly to an appropriate file directory on the storage media of the handheld wireless device. In any embodiment the consumer should be able to view shopping lists on handheld device.

Figure 7:
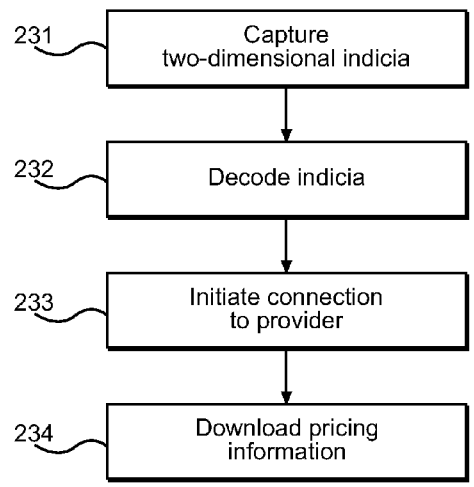
FIG. 7 shows a flow chart diagram of obtaining validity-limited pricing information based on information provided from the capture of two-dimensional visual indicia.

Next, turning to FIG. 7, the consumer updates the pricing information 230 using visual indicia associated with a limited offer (see FIG. 4). Quick response (QR) codes are two-dimensional visual data patterns that are frequently used in advertising to provide consumers with rapid access to advertisers; the codes are easily captured by a user's digital camera and then decoded to obtain information. The present method takes advantage of the rapidly growing use of QR codes in advertising to give consumers an easy way to take advantage of advertised offers. Users can capture an image of a QR code 231 or other two-dimensional visual indicia using the camera of the handheld wireless device. The embedded software application then decodes the two-dimensional indicia 232 obtaining information about a particular offer. The information likes contains a URL to an advertiser website, fileserver, or ftp site. A connection with the advertiser is initiated 233 via the network connection means of the wireless handheld device. Pricing information is then downloaded 234 to the device. Alternatively, the two-dimensional indicia itself may contain the prisoning information rather than initiating a connection with a remote pricing information provider. In this circumstance the embedded application will update internal pricing information based off the decoded information rather than a downloaded file.

Unlike the initially downloaded pricing information, the validity limited pricing information contains pricing data on only those services and products that the advertiser wishes to offer to the consumer. For example, when a consumer takes a picture of a QR code printed in grocery store advertising circular, they will receive pricing information about items that are on sale that week. The pricing information will contain validity limitations that are used by the software application to determine if the offer is still valid. Validity limitations included but are not limited to time-sensitivity, number of items the offer can be used on, minimum purchase requirements, and bundling offers.

Figure 8:
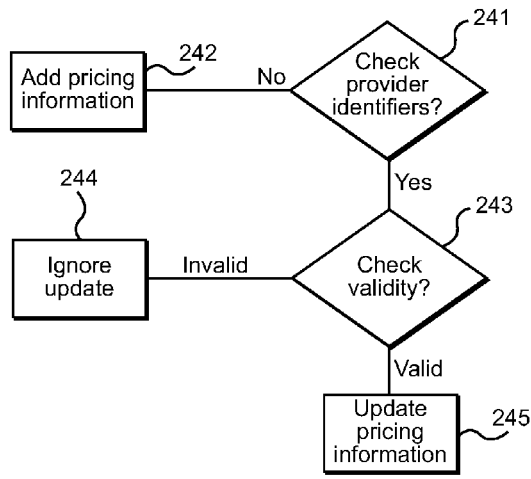
FIG. 8 shows a flow chart diagram of the updating of pricing information stored within the handheld wireless device based on the obtained validity limited pricing information.

Referring now to FIG. 8, the updating of pricing information 240, is carried out by the embedded software application (see FIG. 4), After updated pricing information is downloaded to the handheld wireless device, the software application compares merchant identifier information 241 in the update with the pricing information stored in the storage media. If the merchant identifier of the validity limited pricing information is not found within the stored pricing information, then the new pricing information is added to the stored information 242, but no modification of current pricing in information is made. Conversely, if the merchant identifier of the validity-limited pricing information matches an entry within the stored pricing in information, then the application compares the validity limitations of the new pricing information with the stored information 243. This entails ensuring that the conditions of the validity-limited offer are met and that no time limit has expired. If the validity limited pricing information is invalid then the application does not update the stored information 244 and displays an error message to the user describing the nature of the invalidity. If the validity conditions are met, then the stored pricing information is updated to reflect the advertised offer 245. In a preferred embodiment the embedded software application will check for expired conditions upon start-up and either revert expired entries to a pre-validity limited offer pricing, or prompt the user to ask if he or she would like the entries updated. Confirmation of updating expired offers will return the user to step 210 (see FIG. 4) to obtain pricing information from a remote pricing information provider.

Figure 9:
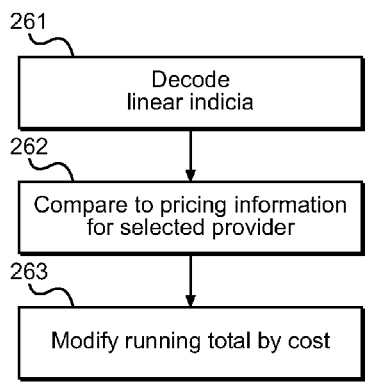
FIG. 9 shows a flow chart diagram of updating a budget total based on the cost of scanned barcodes associated with products or services.

Once the user has obtained validity-limited pricing information, they can begin to select products or services for purchase. A barcode reading means such as a camera or optical scanner on the handheld wireless device is used to read the barcodes of products or service cards. A consumer scans the barcodes of items they wish to purchase 250 to include them in a budget calculation. In FIG. 9, the process of utilizing the scanned linear indicia is shown. Upon scanning, the embedded software application decodes the linear visual indicia 261. The product information is then compared to items within the stored pricing information to obtain a current cost 262. Any special offers or discounts will be applied to this cost if validity limitations are met, i.e., the user purchases two products in a "two for one" deal. The product or item cost is then added or subtracted from a budget total 263. Consumers can elect to start off with a budget and have scanned products deducted from the total or have scanned products tallied until they reach a budget cost. It should be understood that a budget number can be entered into he embedded application at any point during the shopping method. This number can be modified by the user to accommodate a consumer's changing fiscal needs.

Figure 10:
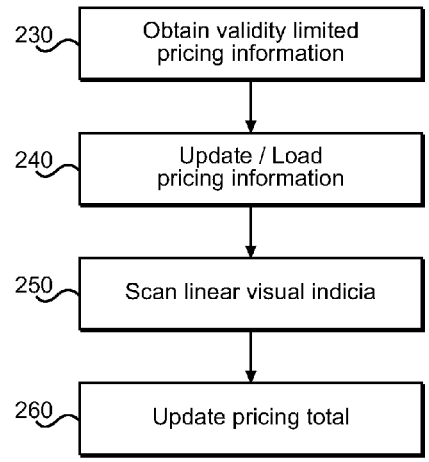
FIG. 10 shows a flow chart of an alternative embodiment of the shopping method.

Turning now to FIG. 10 three is an alternative embodiment of the shopping method. It eliminates the steps of obtaining and pre-oaring the pricing information onto the handheld device. In the alternative embodiment, a consumer scans a two-dimensional indicia such as a QR code to obtain pricing information 230, storing the pricing information on the storage media of the handheld device 240, scanning linear visual indicia associated with products of services 250, and modifying a budget total 260. This shorter method will be appreciated by users who do not pre-plan their shopping experiences. A consumer who decides to visit a store based on a "Sale!" sign will likely not be interested in taking the time to obtain and pre-load pricing information. Thus the consumer can simply download the pricing information associated with the particular items on sale, or specific offers and use it to shop for those specific items of use those particular offers.

Figure 11:
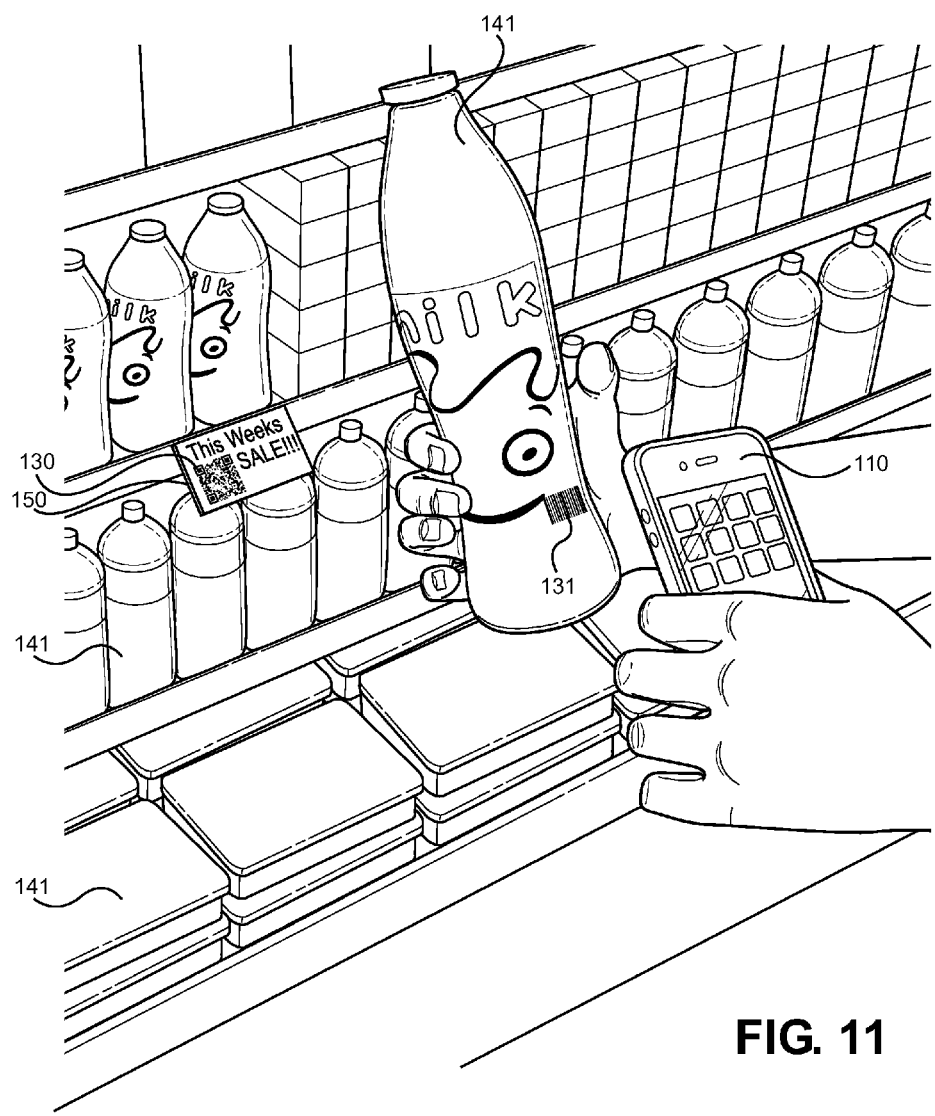
FIG. 11 shows a perspective view of a consumer using the shopping system with a handheld wireless device. The consumer uses the handheld wireless device to scan the barcode of a product and may optional scan a QR code containing weekly sale information.

There is no perfect way to provide QR codes or other two-dimensional indicia to a user. In FIG. 11 a small sign is placed on the shelves of items 141 that are on sale. The consumer can take a picture of a QR code 130 on the generic "sale" 150 tags to obtain validity limited information on all sale items in the store. This is advantageous because only one picture is taken and no shuffling through coupons is required. The user is then free to scan the barcodes 131 products purchase using the handheld wireless device 110. Other means of providing QR codes to users include posters, sales receipts, websites, email attachments, bulk mailings, and so on. The precise method of delivering the visual indicia to the consumers can be determined by advertisers and will vary according to the type of advertising used.

The present invention is thus a system and method for assisting consumer in shopping on a budget and taking advantage of limited offers and advertised specials. It reduces the physical work and time expenditure needed to use limited time offers, discounts, and specials. The present invention eliminates the need for clipping and retaining coupons. It also provides consumers with an easy way to obtain the most recent pricing structure for their favorite stores, and use these pricing structures to shop within their budget. In this way, the present invention is an innovative and unique system and method for promoting fiscally savvy shopping.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of shopping using pre-loaded pricing information, comprising the steps of:
   determining a purchase plan;
   obtaining pricing information from a pricing information provider, wherein said pricing information comprises cost, a provider identifier, validity limitations, and an object identifier;
   loading said pricing information onto a handheld wireless device;
   obtaining an image of a two dimensional visual indicia, wherein said two dimensional visual indicia provides information associated with the retrieval of validity-limited pricing information;
   determining whether a merchant identifier information in said validity-limited pricing information exists within said pricing information, wherein:
   (a) if said merchant identifier does not exist within said pricing information, then storing said validity-limited pricing information within the handheld wireless device, and
   (b) if said merchant identifier does exist within said pricing information, then determining that validity limitations within the validity-limited pricing information have not expired;
   in response to determining that the validity limitations within the validity-limited pricing information have not expired, updating said pricing information on said handheld wireless device with said validity limited pricing information;
   scanning at least one linear visual indicia using said handheld device to obtain a cost associated with a product or service;
   updating a budget total based on an obtained cost.

2. The method of claim 1, wherein said determining of a purchase plan comprises the creation of a shopping list.

3. The method of claim 1, wherein said determination of a purchase plan comprises selection of a category of items.

4. The method of claim 1, wherein said obtaining pricing information comprises the step of logging onto a pricing information provider website.

5. The method of claim 4, further comprising the step of uploading a shopping list.

6. The method of claim 4, further comprising the step of selecting a category from a displayed list.

7. The method of claim 1, wherein said pricing information is downloaded from a pricing information provider server.

8. The method of claim 1, wherein said pricing information is loaded onto said handheld wireless device via a connection between a personal computer and said handheld wireless device.

9. The method of claim 1, wherein said two dimensional indicia is a quick response code.

10. The method of claim 1, wherein said updating of pricing information comprises the step of comparing validity limitations contained within said validity limited pricing information to validity limitations contained in said pricing information.

11. The method of claim 1, wherein said updating of pricing information comprises the step of comparing provider identifiers in said validity limited pricing information with provider identifiers in said pricing in information.

12. The method of claim 11, wherein said validity limited pricing information is appended to said pricing information if said provider identifiers do not match.

13. The method of claim 6, wherein said linear visual indicia is a barcode.

* * * * *